(12) United States Patent
Yamada

(10) Patent No.: US 12,158,659 B2
(45) Date of Patent: Dec. 3, 2024

(54) REFLECTIVE MEMBER, PLANAR LIGHT SOURCE, AND LIQUID CRYSTAL DISPLAY DEVICE

(71) Applicant: NICHIA CORPORATION, Anan (JP)

(72) Inventor: Motokazu Yamada, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/453,095

(22) Filed: Aug. 21, 2023

(65) Prior Publication Data

US 2024/0069380 A1 Feb. 29, 2024

(30) Foreign Application Priority Data

Aug. 31, 2022 (JP) ................. 2022-138188

(51) Int. Cl.
*G02F 1/13357* (2006.01)

(52) U.S. Cl.
CPC .. *G02F 1/133606* (2013.01); *G02F 1/133605* (2013.01); *G02F 2202/28* (2013.01)

(58) Field of Classification Search
CPC ......... G02F 1/133603; G02F 1/133605; G02F 1/133606; F21V 7/00; F21V 7/04; F21V 7/005
See application file for complete search history.

(56) References Cited

U.S. PATENT DOCUMENTS

| | | | |
|---|---|---|---|
| 2008/0225553 A1 | 9/2008 | Roberts et al. | |
| 2011/0292316 A1* | 12/2011 | Fujimoto | G02F 1/133605 349/58 |
| 2012/0069248 A1* | 3/2012 | Yokota | G02F 1/133605 362/217.05 |
| 2012/0262631 A1 | 10/2012 | Kuromizu | |
| 2014/0211121 A1* | 7/2014 | Cho | G02F 1/133608 349/58 |
| 2016/0223864 A1 | 8/2016 | Ha | |
| 2016/0252775 A1* | 9/2016 | Lu | G02F 1/133605 362/97.1 |
| 2019/0227384 A1* | 7/2019 | Watanabe | G02F 1/133603 |
| 2019/0310516 A1* | 10/2019 | Kyoukane | G02F 1/133603 |
| 2020/0073174 A1* | 3/2020 | Yasunaga | G02F 1/133603 |

(Continued)

FOREIGN PATENT DOCUMENTS

| | | |
|---|---|---|
| CN | 112764267 A | 5/2021 |
| JP | 2010-521776 A | 6/2010 |

(Continued)

*Primary Examiner* — Zheng Song
(74) *Attorney, Agent, or Firm* — Global IP Counselors, LLP

(57) ABSTRACT

A planar light source includes a substrate, a reflective member having a plurality of openings and at least one slit, and a light source disposed in each of the openings. The plurality of openings are arranged in m rows along a first direction and in n columns along a second direction that intersects the first direction. The at least one slit includes at least one first slit arranged in a first region and intersecting a first virtual straight line at a prescribed position in the first region. The first virtual straight line is parallel to the first direction. The first region is located between one or more openings in a kth row (k is an integer equal to or greater than 1 and less than or equal to m−1) and one or more openings in a (k+1)th row and extends in the first direction.

18 Claims, 13 Drawing Sheets

(56) References Cited

U.S. PATENT DOCUMENTS

2021/0041744 A1\* 2/2021 Ishida ............... G02F 1/133605
2021/0247051 A1\* 8/2021 Nakabayashi ....... G02B 6/0021

FOREIGN PATENT DOCUMENTS

| JP | 2013-118117 A | 6/2013 |
| JP | 2016-143668 A | 8/2016 |
| JP | 2017-045559 A | 3/2017 |
| JP | 2020-119711 A | 8/2020 |
| KR | 10-2015-062796 A | 6/2015 |
| WO | 2011/080979 A1 | 7/2011 |

\* cited by examiner

FIG.4
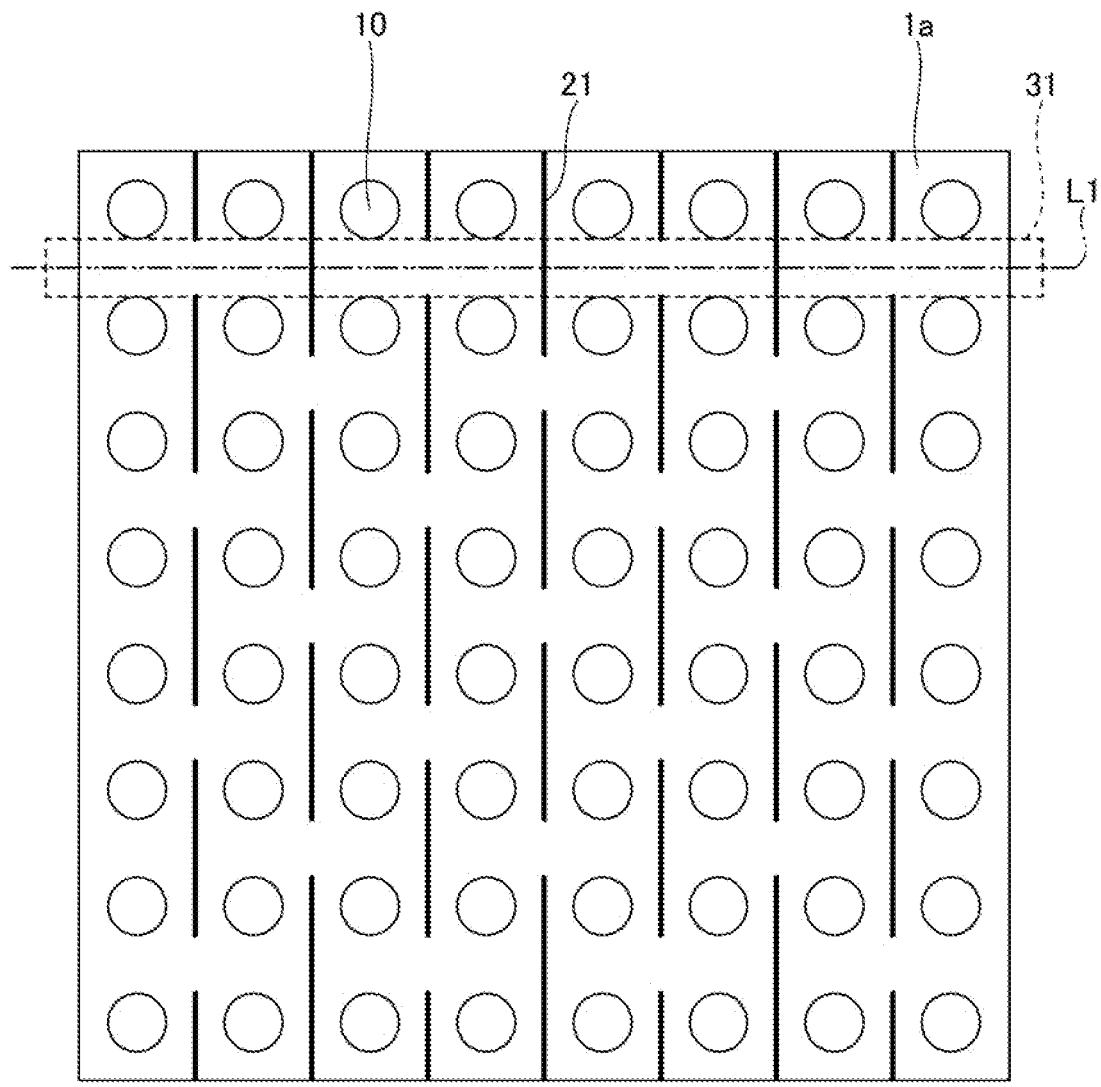
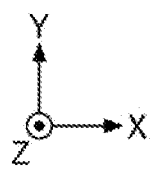

FIG.6
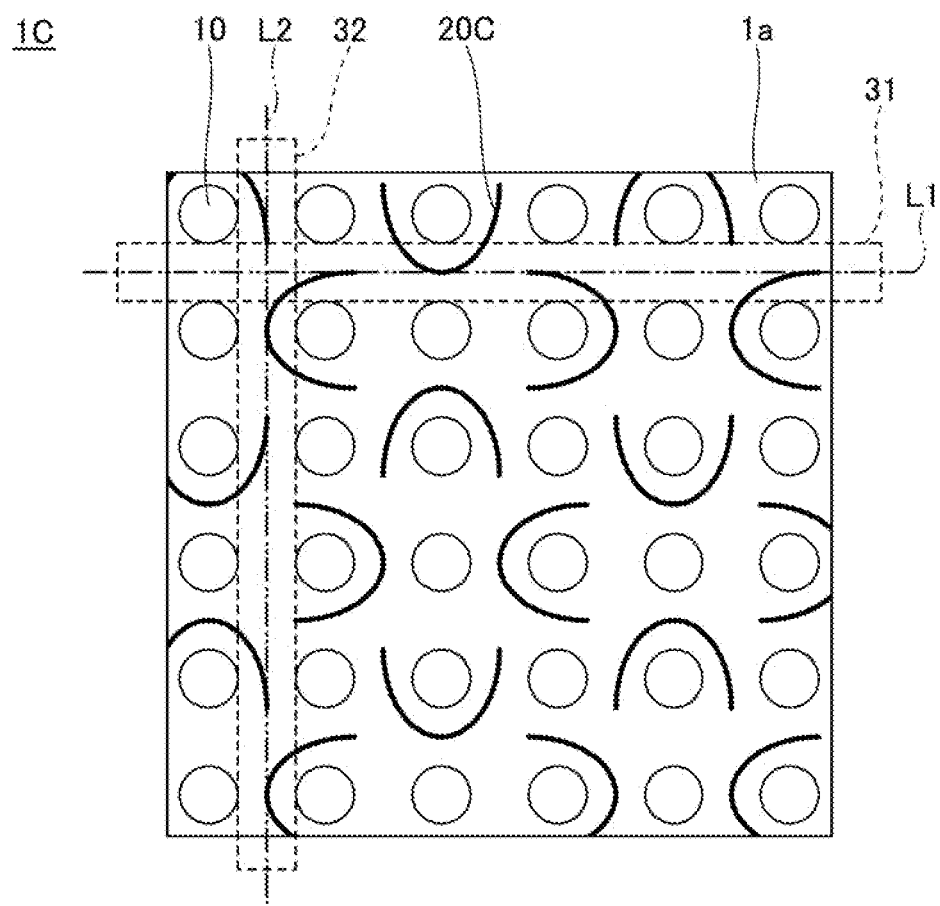
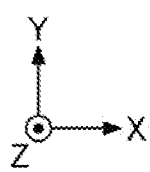

FIG.8
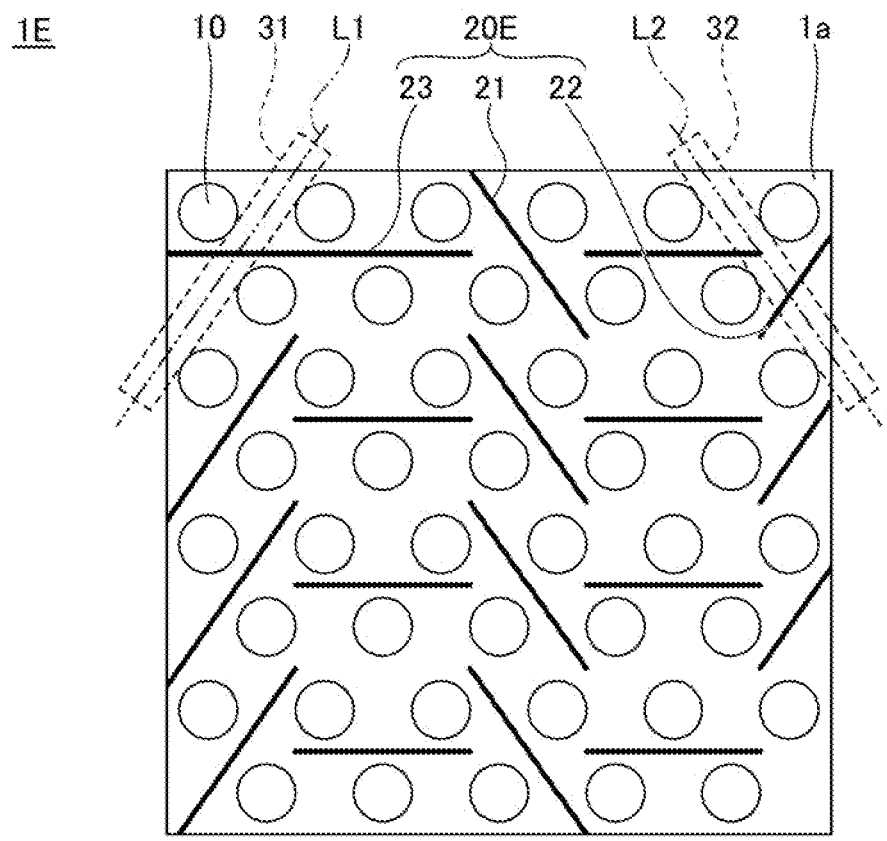
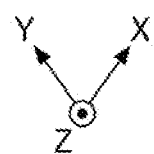

ical scope of the present invention is not limited by the
REFLECTIVE MEMBER, PLANAR LIGHT SOURCE, AND LIQUID CRYSTAL DISPLAY DEVICE

CROSS-REFERENCE TO RELATED APPLICATIONS

This application is based on and claims priority to Japanese Patent Application No. 2022-138188, filed on Aug. 31, 2022, the entire contents of which are incorporated herein by reference.

BACKGROUND

The disclosure herein relates to a reflective member, a planar light source, and a liquid crystal display device.

Japanese Patent Publication No. 2010-521776 proposes a solid state lighting tile that includes a substrate, a solid state lighting element mounted on the surface of the substrate, and a reflector sheet on the surface of the substrate. In the solid state lighting tile, the reflector sheet can have a plurality of perforation apertures across the reflector sheet, and the perforation apertures can serve to provide expandable zones.

SUMMARY

One of the objects of this disclosure is to reduce thermal contraction of a reflective member in a planar light source including the reflective member. Another object is to provide the reflective member used in the planar light source, and to provide a liquid crystal display device using the planar light source.

According to an embodiment of the present disclosure, a planar light source includes a substrate, a reflective member, and one or more light sources. The reflective member is disposed on the substrate and defines at least one slit and a plurality of openings arranged in m rows along a first direction and in n columns along a second direction that intersects the first direction. One or more light sources are disposed on the substrate and disposed in one or more of the openings of the reflective member in a plan view. The at least one slit includes at least one first slit arranged in a first region and intersecting a first virtual straight line at a prescribed position in the first region. The first virtual straight line is parallel to the first direction. The first region is located between one or more of the openings in a kth row (k is an integer equal to or greater than 1 and less than or equal to m−1) and one or more of the openings in a (k+1)th row, and the first region extends in the first direction.

BRIEF DESCRIPTION OF THE DRAWINGS

Other objects and further features of the present disclosure will be apparent from the following detailed description when read in conjunction with the accompanying drawings, in which:

FIG. 4 is a plan view of an exemplary reflective member 1A;

FIG. 6 is a plan view of an exemplary reflective member 1C;

FIG. 8 is a plan view of an exemplary reflective member 1E;

DETAILED DESCRIPTION

Figure 1:
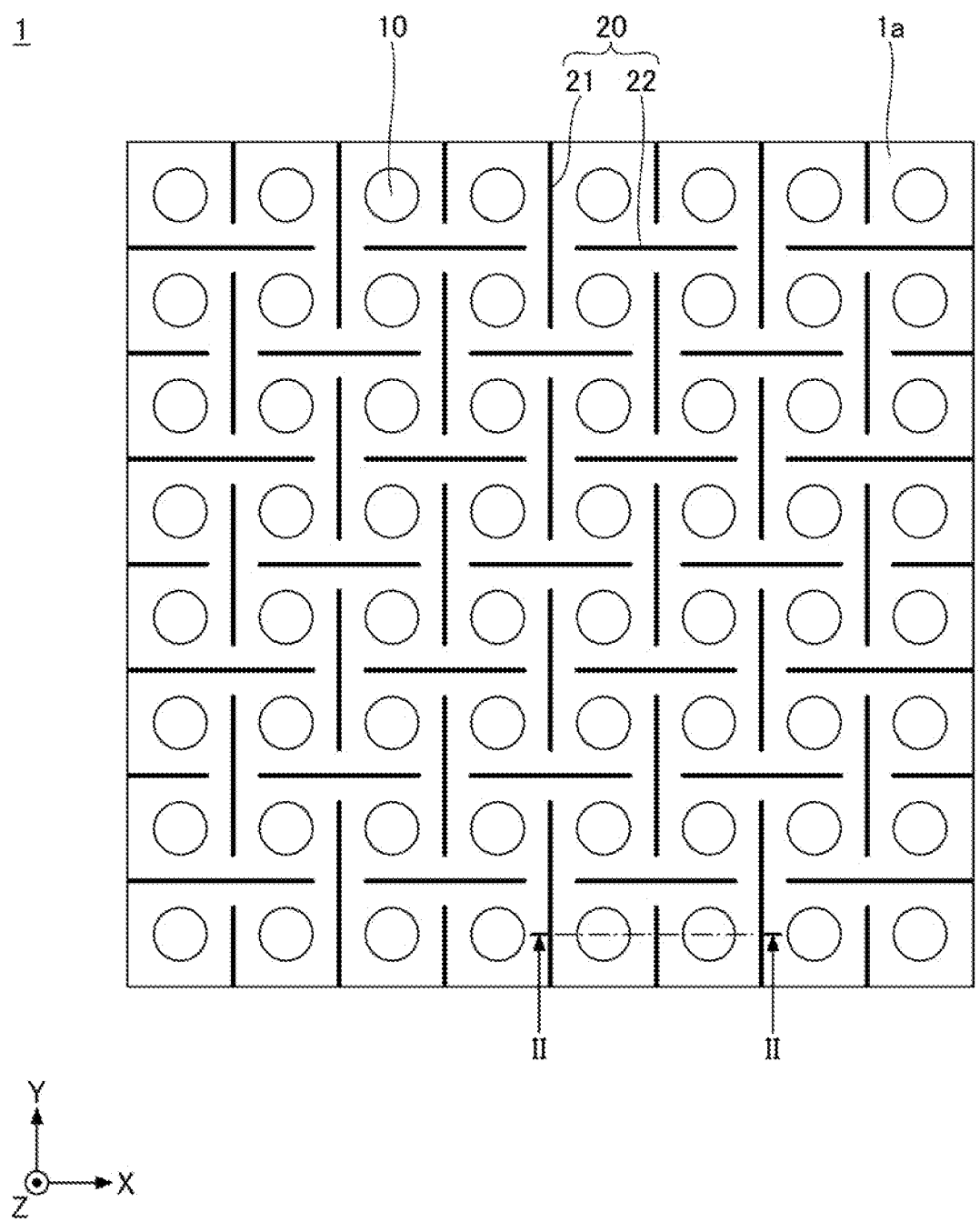
FIG. 1 is a plan view of an exemplary reflective member 1.

In the following, embodiments of the present invention will be described with reference to the accompanying drawings. In the following description, terms indicating specific directions and positions (for example, "upper", "lower", and other terms related to these terms) are used as necessary. These terms are used to facilitate understanding of the present invention with reference to the drawings, and the technical scope of the present invention is not limited by the meaning of these terms. The same reference numerals appearing in a plurality of drawings refer to the same or equivalent portions or members.

Further, the following embodiments exemplify a planar light source and the like to embody the technical idea of the present invention, and the present invention is not limited to the following description. In addition, unless otherwise specified, the dimensions, materials, shapes, relative arrangements, and the like of components described below are not intended to limit the scope of the present invention thereto, but are described as examples. The contents described in one embodiment can be applied to other embodiments and modifications. The sizes, positional relationships, and the like of members illustrated in the drawings can be exaggerated for clearer illustration. Furthermore, in order to avoid excessive complication of the drawings, a schematic view in which some elements are not illustrated may be used, or an end view illustrating only a cut surface may be used as a cross-sectional view.

First Embodiment

A planar light source according to a first embodiment includes a substrate, a plurality of light sources, and a reflective member. The plurality of light sources and the reflective member are disposed on the substrate. The reflective member is a member configured to reflect light from the light sources.

In the following, the reflective member will be described first, and subsequently, the planar light source will be described.

Reflective Member 1

Figure 2:
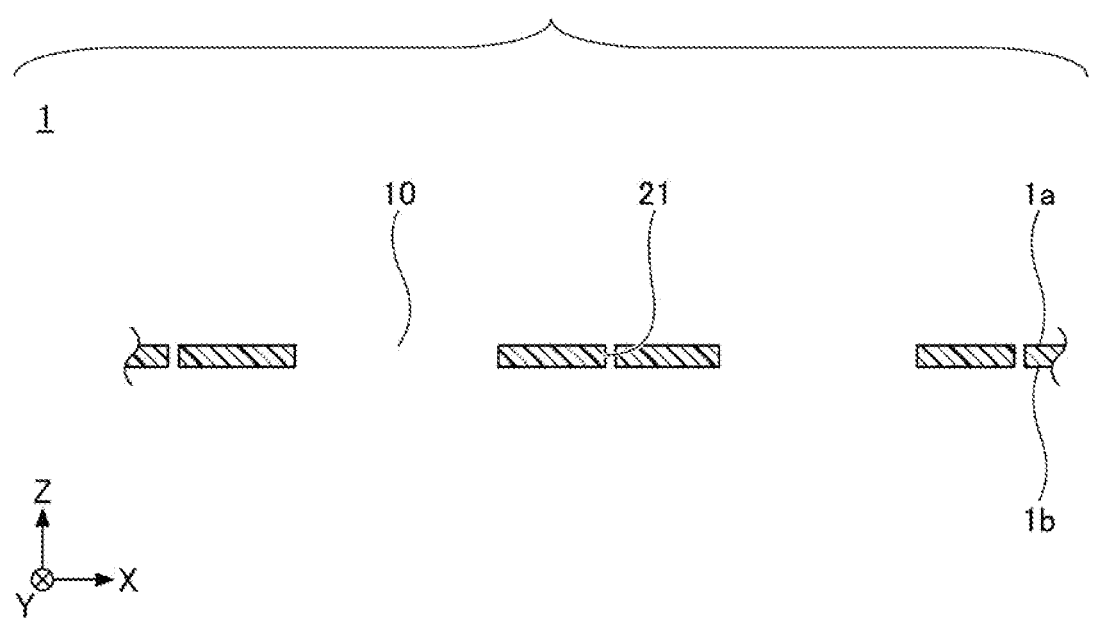
FIG. 2 is a cross-sectional view of the reflective member 1 taken through II-II of FIG. 1.

FIG. 1 is a plan view of an exemplary reflective member 1. FIG. 2 is a cross-sectional view of the reflective member 1 taken through II-II of FIG. 1. In the present specification, an XYZ coordinate system is used for convenience of description. In FIGS. 1 and 2, the thickness direction of the reflective member 1 is defined as a Z direction, the direction orthogonal to the Z direction is defined as an X direction, and the direction orthogonal to the Z direction and the X direction is defined as a Y direction. In FIGS. 1 and 2, of the X and Y directions orthogonal to each other, the X direction is referred as a first direction X and the Y direction is referred to as a second direction Y. Further, in the X direction, the start point (tail) side of the arrow may be referred to as a −X side and the end point (arrowhead) side of the arrow may be referred to as a +X side. The same applies to the Y direction and the Z direction. As used herein, the expression "in a plan view" refers to viewing an object from the +Z side along the Z direction.

In the example illustrated in FIG. 1, the reflective member 1 has a rectangular shape in a plan view. In the example illustrated in FIG. 2, the reflective member 1 has a sheet shape having an upper surface 1a and a lower surface 1b. The upper surface 1a and the lower surface 1b can be substantially parallel to each other. The thickness of the reflective member 1 is, for example, 0.2 mm or more and 0.3 mm or less.

As illustrated in FIGS. 1 and 2, the reflective member 1 has a plurality of openings 10 and one or more slits 20. Each of the openings 10 is a region in which a light source can be disposed when the reflective member 1 is used in the planar light source. The openings 10 penetrate from the upper surface 1a to the lower surface 1b of the reflective member 1. In the example illustrated in FIG. 1, each of the openings 10 has a circular shape in a plan view. In the example illustrated in FIG. 1, the openings 10 have the same size.

In the example illustrated in FIG. 1, the plurality of openings 10 are arranged in eight rows along the first direction X and in eight columns along the second direction Y. That is, in the example illustrated in FIG. 1, the plurality of openings 10 are arranged in eight rows and eight columns.

The numbers of openings 10 arranged in the first direction X and in the second direction Y are not limited to those illustrated in the example of FIG. 1, and are set according to the required specifications such as the size of the planar light source, in which the reflective member 1 is installed, and the required amount of light. That is, a plurality of openings 10 are arranged in m rows (m is an integer equal to or greater than 2) along the first direction and arranged in n columns (n is an integer equal to or greater than 2) along the second direction intersecting the first direction.

In the reflective member 1, the number of openings 10 in each row may be the same or may be different. Further, the number of openings 10 in each column may be the same or may be different.

In the example illustrated in FIG. 1, the slits 20 includes one or more first slits 21 and one or more second slits 22. The first slits 21 are separated from the second slits 22. The first slits 21 are linear and extend in the second direction Y. The second slits 22 are linear and extend in the first direction X. In the example illustrated in FIG. 1, the first slits 21 are parallel to the second direction Y, and the second slits 22 are parallel to the first direction X. The first slits 21 do not need to be parallel to the second direction Y in a strict sense, and the first slits 21 may be inclined within a range of 10° or less with respect to the second direction Y. Similarly, the second slits 22 may be inclined within a range of 10° or less with respect to the first direction X. The first slits 21 can be referred to as vertical slits, and the second slits 22 can be referred to as horizontal slits.

As illustrated in FIG. 2, the first slits 21 penetrate from the upper surface 1a to the lower surface 1b of the reflective member 1. Similarly, the second slits 22 penetrate from the upper surface 1a to the lower surface 1b of the reflective member 1. In the example of FIG. 2, the direction in which the first slits 21 and the second slits 22 penetrate the reflective member 1 is a direction perpendicular to the upper surface 1a of the reflective member 1.

In order to make the first slits 21 easily visible, FIG. 2 illustrates a state in which the first slits 21 are opened. It is preferable for the first slits 21 not to be opened in a state in which the reflective member 1 does not undergo thermal contraction. That is, it is preferable for the lateral surfaces of the reflective member 1 defining each of the first slits 21 to contact each other in a state in which the reflective member 1 does not undergo thermal contraction. Accordingly, in a case where the reflective member 1 is used in the planar light source, optical effects such as luminance nonuniformity and chromaticity nonuniformity can be reduced by the first slits 21 and the second slits 22.

The slits 20 are formed to have a width of approximately several hundreds of micrometers, for example, by preparing a reflective member intermediate body having no slits 20 and making cuts in the reflective member intermediate body by using a cutting tool such as a cutter. If the reflective member 1 is formed by injection molding or the like, a die is placed on portions corresponding to the slits 20 such that no portions of the reflective member 1 are formed in the portions corresponding to the slits 20.

The slits 20 may be formed, for example, by preparing a reflective member intermediate body having no slits 20 and punching the reflective member intermediate body by using a cutting die. Specifically, the slits 20 can be formed in the reflective member intermediate body by placing a cutting die on the lower surface of the reflective member intermediate body and pressing the reflective member intermediate body via a backing plate from the upper surface side of the reflective member intermediate body. This method is preferable from the viewpoint of not generating burrs during the formation of the slits 20. In this case, the slits 20 may be formed over the entire reflective member intermediate body in one punching motion or several punching motions, or may be formed by punching one by one.

Figure 3:
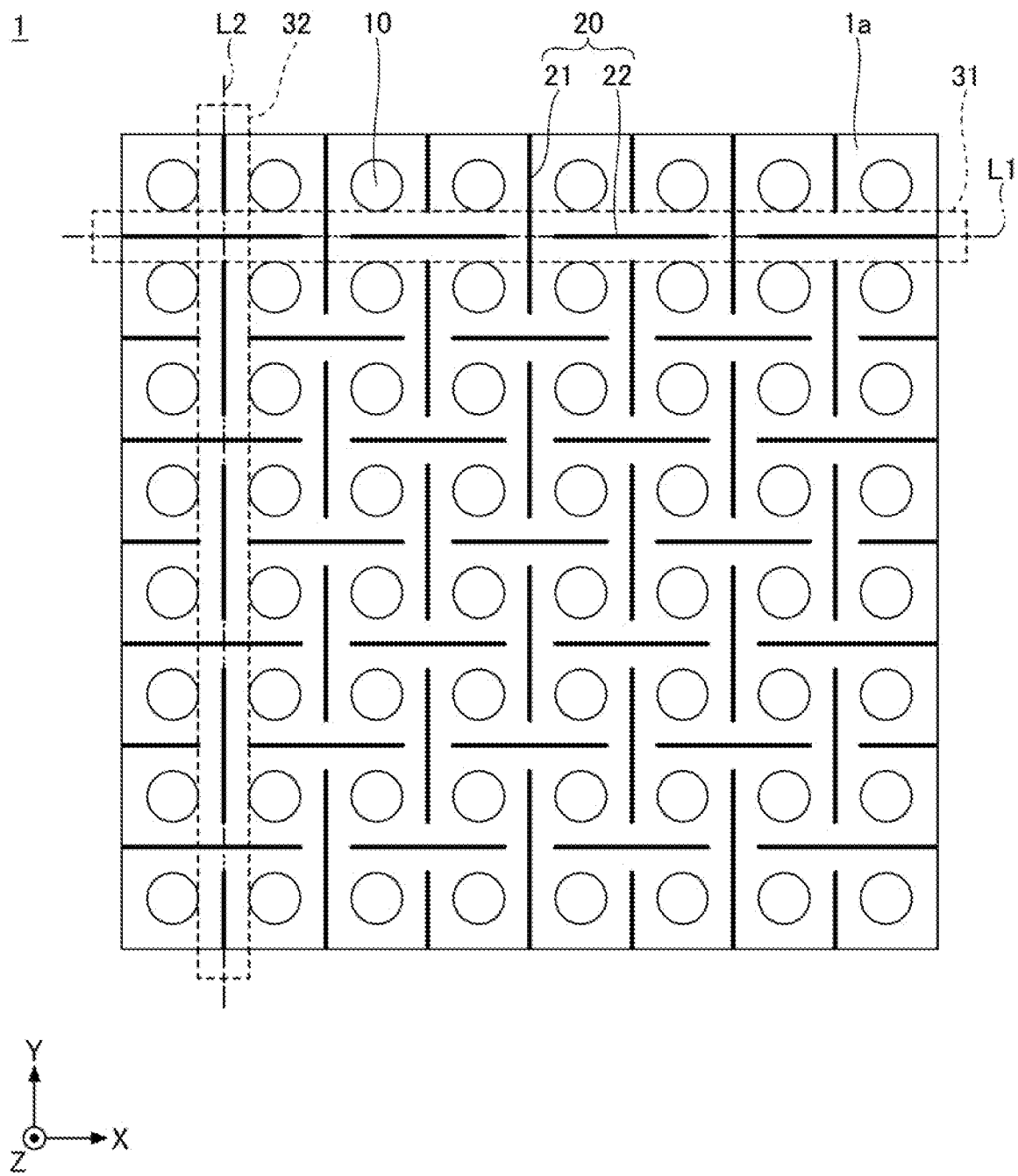
FIG. 3 is a plan view illustrating the arrangement of slits.

In FIG. 3, a first region 31 is located between a plurality of openings 10 in the kth row (k is one or more integers equal to or greater than 1 and less than or equal to 7) and a plurality of openings 10 in the (k+1)th row. The first region 31 is a region extending in the first direction X and reaching from one outer edge to the other outer edge of the reflective member 1 in the first direction X.

In the reflective member 1, at least one first slit 21 is provided in the first region 31. The at least one first slit 21 intersects a first virtual straight line L1 at a prescribed position in the first region 31. The first virtual straight line L1 is parallel to the first direction X. That is, regardless of where the first virtual straight line L1 is located in the first region 31, the first virtual straight line L1 intersects the at least one first slit 21. The first virtual straight line L1 is a straight line connecting a point on one outer edge to a point on the other outer edge of the reflective member 1. The first virtual straight line L1 can be located at a prescribed position in the first region 31.

In the example of FIG. 3, in the second direction Y, the length of each of first slits 21 is greater than the length of the first region 31. However, the length of each of the first slits 21 is not limited thereto, and may be the same as the length of the first region 31 in the second direction Y or may be smaller than the length of the first region 31 in the second direction Y. If the length of each of the first slits 21 is smaller than the length of the first region 31 in the second direction Y, two or more first slits 21 may be provided so as to satisfy the requirement that the first virtual straight line L1 intersects at least one first slit 21 at a prescribed position in the first region 31. The length of the first region 31 in the second direction Y refers to a length from the −Y side end of one of two openings 10 located on the +Y side to the +Y side end of the other one of the two openings 10 located on the −Y side between the two openings 10 adjacent to each other in the second direction Y.

In the example illustrated in FIG. 3, k is 1. That is, in the example of FIG. 3, at least one first slit 21 is provided in the first region 31 between a plurality of openings 10 in the first row and a plurality of openings 10 in the second row and extending in the first direction X. The at least one first slit 21 intersects the first virtual straight line L1 at a prescribed position in the first region 31. The first virtual straight line L1 is parallel to the first direction X. In the example of FIG. 3, a plurality of first slits 21 and a plurality of second slits 22 are provided in the first region 31, and the first slits 21 and the second slits 22 are alternately disposed in the first direction X.

k is not necessarily 1, and may be a discretionary one integer equal to or greater than 2 and less than or equal to 7. That is, k may be a discretionary integer as long as at least one first slit 21 is provided in one first region 31 located between two adjacent rows of a plurality of openings 10, and the at least one first slit 21 intersects the first virtual straight line L1 at a prescribed position in the first region 31.

k may be two or more integers equal to or greater than 1 and less than or equal to 7. For example, if k is two integers, 1 and 7, one first region 31 is located between a plurality of openings 10 in the first row and a plurality of openings 10 in the second row, and another first region 31 is located between a plurality of openings 10 in the seventh row and a plurality of openings 10 in the eighth row. In this case, at least one first slit 21 is provided in each of the first regions 31, and the at least one first slit 21 intersects a corresponding first virtual straight line L1 at a prescribed position in each of the first regions 31.

k may be every integer equal to or greater than 1 and less than or equal to 7. In this case, seven first regions 31 are located between all adjacent rows of a plurality of openings 10. At least one first slit 21 is provided in each of the seven first regions 31, and the at least one first slit 21 intersect a corresponding first virtual straight line L1 at a prescribed position in each of the seven first regions 31.

Further, in FIG. 3, a second region 32 is located between a plurality of openings 10 in the jth column (j is one or more integers equal to or greater than 1 and less than or equal to 7) and a plurality of openings 10 in the (j+1)th column. The second region 32 is a region extending in the second direction Y and reaching from one outer edge to the other outer edge of the reflective member 1 in the second direction Y.

In the reflective member 1, at least one second slit 22 is provided in the second region 32. The at least one second slit 22 intersects a second virtual straight line L2 at a prescribed position in the second region 32. The second virtual straight line L2 is parallel to the second direction Y. That is, regardless of where the second virtual straight line L2 is located in the second region 32, the second virtual straight line L2 intersects the at least one second slit 22. The second virtual straight line L2 is a straight line connecting a point on one outer edge to a point on the other outer edge of the reflective member 1. The second virtual straight line L2 can be located at a prescribed position in the second region 32.

In the example of FIG. 3, the length of each of second slits 22 is greater than the length of the second region 32 in the first direction X. However, the length of each the of second slits 22 is not limited thereto, and may be the same as the length of the second region 32 in the first direction X or may be smaller than the length of the second region 32 in the first direction X. If the length of each of the second slits 22 is smaller than the length of the second region 32 in the first direction X, two or more second slits 22 may be provided so as to satisfy the requirement that the second virtual straight line L2 intersects at least one second slit 22 at a prescribed position in the second region 32. The length of the second region 32 in the first direction X refers to a length from the −X side end of one of two openings 10 located on the +X side to the +X side end of the other one of the two openings 10 located on the −X side between the two openings 10 adjacent to each other in the first direction X.

In the example illustrated in FIG. 3, j is 1. That is, in the example of FIG. 3, at least one second slit 22 is provided in the second region 32 located between a plurality of openings 10 in the first column and a plurality of openings 10 in the second column and extending in the second direction Y. The at least one second slit 22 intersects the second virtual straight line L2 at a prescribed position in the second region 32. The second virtual straight line L2 is parallel to the second direction Y. In the example of FIG. 3, a plurality of first slits 21 and a plurality of second slits 22 are provided in the second region 32, and the first slits 21 and the second slits 22 are alternately disposed in the second direction Y.

j is not necessarily 1, and may be a discretionary one integer equal to or greater than 2 and less than or equal to 7. That is, j may be a discretionary integer as long as at least one second slit 22 is provided in one second region 32 located between two adjacent rows of a plurality of openings 10, and the at least one second slit 22 intersects the second virtual straight line L2 at a prescribed position in the second region 32.

j may be two or more integers equal to or greater than 1 and less than or equal to 7. For example, if j is two integers, 1 and 7, one second region 32 is located between a plurality of openings 10 in the first column and a plurality of openings 10 in the second column, and another second region 32 is located between a plurality of openings 10 in the seventh column and a plurality of openings 10 in the eighth column. In this case, at least one second slit 22 is provided in each of the second regions 32, and the at least one second slit 22 intersects a corresponding second virtual straight line L2 at a prescribed position in each of the second regions 32.

j may be every integer equal to or greater than 1 and less than or equal to 7. In this case, seven second regions 32 are located between all adjacent columns of a plurality of openings 10. At least one second slit 22 is provided in each of the seven second regions 32, and the at least one second slit 22 intersect a corresponding second virtual straight line L2 at a prescribed position in each of the seven second regions 32.

In the planar light source including the reflective member 1, the reflective member 1 may contract when a thermal load is applied to the reflective member 1, for example, when the planar light source including the reflective member 1 is stored under high temperature conditions or when the light sources are driven. Even if the reflective member 1 alone is stored under high temperature conditions, the reflective member 1 may undergo thermal contraction.

When a thermal load is applied to a reflective member, the reflective member contracts towards its central area and the outer shape of the reflective member becomes smaller in a plan view. At this time, the positions of openings located nearer to the outer edge of the reflective member tend to be deviated from their positions before contraction, as compared to openings located farther from the outer edge of the reflective member. Depending on the degree of positional deviation of such an opening, there may be a possibility that portions of the reflective member defining the opening may contact a light source. If the reflective member contacts a light source, optical influences such as luminance nonuniformity and chromaticity nonuniformity would occur.

In the reflective member 1, at least one first slit 21 is provided in a first region 31 extending in the first direction X and located between a plurality of openings 10 in the kth row (k is one or more integers equal to or greater than 1 and less than or equal to 7) and a plurality of openings 10 in the (k+1)th row. The at least one first slit 21 intersects a first virtual straight line L1 at a prescribed position in the first region 31. The first virtual straight line L1 is parallel to the first direction X. In addition, in the reflective member 1, at least one second slit 22 is provided in a second region 32 extending in the second direction Y and located between a plurality of openings 10 in the jth column (j is one or more integers equal to or greater than 1 and less than or equal to 7) and a plurality of openings 10 in the (j+1)th column. The at least one second slit 22 intersects a second virtual straight line L2 at a prescribed position in the second region 32. The second virtual straight line L2 is parallel to the second direction Y.

Accordingly, when a thermal load is applied to the reflective member 1, the at least one first slit 21 and the at least one second slit 22 are opened. As a result, the outer shape of the reflective member 1 is unlikely to become small, and the positional deviation of the openings 10 can be suppressed. Accordingly, the influence of a thermal load on the optical characteristics of the planar light source can be reduced, and optical influences such as luminance nonuniformity and chromaticity nonuniformity in the planar light source can be reduced.

The nearer the openings to the outer edge of the reflective member 1 are, the larger the positional deviation of the openings 10 due to contraction is. Therefore, in order to effectively suppress the positional deviation of the openings 10, the at least one first slit 21 preferably includes at least one first slit 21 that reaches the outer edge of the reflective member 1 in a second region 32. Further, the at least one second slit 22 preferably includes at least one second slit 22 that reaches the outer edge of the reflective member 1 in a first region 31. In the example illustrated in FIG. 1, first slits 21 that reach the outer edge of the reflective member 1 include first slits 21 having the same length as that of first slits 21 that do not reach the outer edge of the reflective member 1, and include first slits 21 having a length smaller than that of the first slits 21 that do not reach the outer edge of the reflective member 1. The first slits 21 that reach the outer edge of the reflective member 1 are not necessarily provided in second regions 32, and may be provided outside the second regions 32. Further, the second slits 22 that reach the outer edge of the reflective member 1 are not necessarily provided in first regions 31, and may be provided outside the first regions 31.

First slits 21 of a reflective member 1A, third slits 23 and fourth slits 24 of a reflective member 1B, slits 20C of a reflective member 1C, slits 20D of a reflective member 1D, and first slits 21, second slits 22, and third slits 23 of a reflective member 1E, all of which will be described later, preferably include slits that reach the outer edges of the reflective members.

The plurality of first slits 21 that do not reach the outer edge of the reflective member 1 may have the same length or may have different lengths. Further, the plurality of second slits 22 that do not reach the outer edge of the reflective member 1 may have the same length or may have different lengths.

With respect to the first slits 21 of the reflective member 1A, the third slits 23 and the fourth slits 24 of the reflective member 1B, the slits 20C of the reflective member 1C, the slits 20D of the reflective member 1D, and the first slits 21, the second slits 22, and the third slits 23 of the reflective member 1E, all of which will be described later, if each of the reflective members has a plurality of slits, the plurality of slits may have the same length or may have different lengths.

The positional deviation of the openings 10 due to contraction is smaller at the central area than the outer area of the reflective member 1. Therefore, the length of first slits 21 and second slits 22 provided at the central area of the reflective member 1 can be made smaller than the length of first slits 21 and second slits 22 provided at the outer area of the reflective member 1. Accordingly, when the reflective member 1 is used in the planar light source, among portion(s) of light emitted from the light sources, portion(s) of light incident on slits can be reduced. Therefore, optical influences such as luminance nonuniformity and chromaticity nonuniformity in the planar light source can be suppressed.

Further, the positional deviation of the openings 10 due to contraction is smaller at the central area than the outer edge of the reflective member 1. Therefore, no first slits 21 and no second slits 22 may be provided at the central area of the reflective member 1. Accordingly, as described above, when the reflective member 1 is used in the planar light source, among portion(s) of light emitted from the light sources, portion(s) of light incident on slits can be reduced. Therefore optical effects such as luminance nonuniformity and chromaticity nonuniformity in the planar light source can be reduced.

The length of slits provided at the central area can be made smaller than the length of slits provided at the outer area of each of the reflective members 1A to 1E, all of which will be described later. Further, no slits may be provided at the central area of each of the reflective members 1A to 1E.

In a case where a plurality of openings 10 are arranged in m rows along the first direction X, and a plurality of openings 10 are arranged in n columns along the second direction Y, at least one first slit 21 is provided in a first region 31 located between a plurality of openings 10 in the kth row (k is one or more integers equal to or greater than 1 and less than or equal to—m−1) and a plurality of openings 10 in the (k+1)th row and extending in the first direction X. The at least one first slit 21 intersects a first virtual straight line L1 at a prescribed position in the first region 31. The first virtual straight line L1 is parallel to the first direction X. Further, in a case where the plurality of openings 10 are arranged in the m rows along the first direction X, and the plurality of openings 10 are arranged in the n columns along the second direction Y, at least one second slit 22 is provided in a second region 32 located between a plurality of openings 10 in the jth column (j is one or more integers equal to or greater than 1 and less than or equal to n−1) and a plurality of openings 10 in the (j+1)th column and extending in the second direction Y. The at least one second slit 22 intersects a second virtual straight line L2 at a prescribed position in the second region 32. The second virtual straight line L2 is parallel to the second direction Y.

In the example illustrated in FIG. 1, the first slits 21 and the second slits 22 are separated from one another. However, the present disclosure is not limited thereto, and the at least one first slit 21 and the at least one second slit 22 may be connected so as to form a cross shape, an L-shape, a T-shape, or the like in a plan view. Further, first slits 21 and second slits 22 that are separated from one another, and first slits 21 and second slits 22 that are connected to one another may be provided.

It is assumed that a third virtual straight line connecting two points located on different sides of the reflective member 1 is drawn in a plan view. In this case, if the length of the third virtual straight line is longer than two thirds of the length of the short side of the minimum bounding rectangle of the reflective member 1, the third virtual straight line intersects an opening 10 and/or a slit 20 in any direction and at any position. Conversely, if the length of the third virtual straight line is less than or equal to two thirds of the length of the short side of the minimum bounding rectangle of the reflective member 1, the third virtual straight line may or may not intersect an opening 10 and/or a slit 20 in any direction and at any position. As used herein, the minimum bounding rectangle is the smallest rectangle or square that circumscribes an object. Since the shape of the reflective member 1 is a square in a plan view, the length of the short side of the minimum bounding rectangle is the length of one side of the square.

Reflective Member 1A

The reflective member 1A is another example of the reflective member. FIG. 4 is a plan view of the exemplary reflective member 1A. The reflective member 1A differs from the reflective member 1 (see FIG. 1 and the like) in that the reflective member 1A includes first slits 21 only, and no second slits 22 are provided.

In the reflective member 1A, at least one first slit 21 is provided in at least one first region 31, and the at least one first slit 21 intersects a first virtual straight line L1 at a prescribed position in the first region 31. The first virtual straight line L1 is parallel to the first direction X. Therefore, when a thermal load is applied to the reflective member 1A, the at least one first slit 21 is opened, thereby suppressing the positional deviation of openings in the first direction X. The reflective member 1A can include the at least one first slit 21.

Reflective Member 1B

Figure 5:
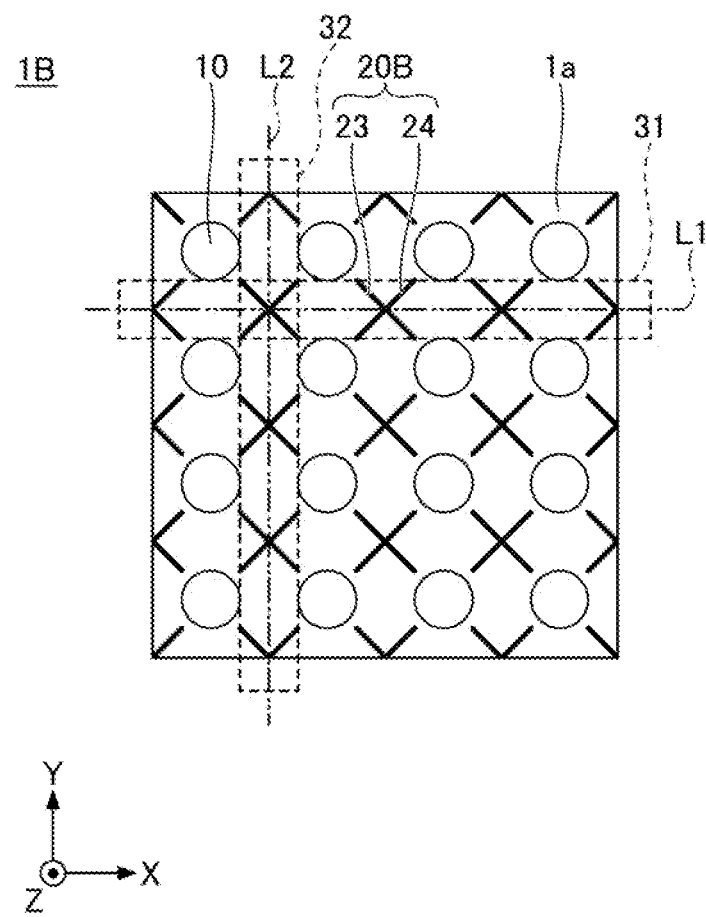
FIG. 5 is a plan view of an exemplary reflective member 1B.

The reflective member 1B is another example of the reflective member. FIG. 5 is a plan view of the exemplary reflective member 1B. The reflective member 1B differs from the reflective member 1 (see FIG. 1 and the like) in that the slits 20 are replaced by slits 20B. In FIG. 5, as an example, openings 10 are arranged in four rows and four columns.

Each of the slits 20B includes a third slit 23 and a fourth slit 24, and the third slit 23 and the fourth slit 24 are connected to each other. In each of the slits 20B, the third slit 23 is linear and extends in a direction intersecting the first direction X and the second direction Y. The fourth slit 24 is linear, intersects the third slit 23, and extends in a direction intersecting the first direction X and the second direction Y. Slits inclined with respect to the first direction X and the second direction Y, such as the third slit 23 and the fourth slit 24, can be referred to as inclined slits.

The slits 20B may have a cross shape, an L-shape, or a T-shape in a plan view. In each of the slits 20B, the third slit 23 and the fourth slit 24 may intersect each other orthogonally or obliquely. In the example of FIG. 5, a plurality of third slits 23 and a plurality of fourth slits 24 are provided in a first region 31 extending in the first direction X. In addition, a plurality of third slits 23 and a plurality of fourth slits 24 are provided in a second region 32 extending in the second direction Y.

In the reflective member 1B, at least one slit 20B is provided in at least one first region 31, and the at least one slit 20B intersects a first virtual straight line L1 at a prescribed position in the first region 31. The first virtual straight line L1 is parallel to the first direction X. Further, in the reflective member 1B, at least one slit 20B is provided in at least one second region 32, and the at least one slit 20B intersects a second virtual straight line L2 at a prescribed position in the second region 32. The second virtual straight line L2 is parallel to the second direction Y. Accordingly, when a thermal load is applied to the reflective member 1B, the slits 20B are opened, and thus, substantially the same effects as those of the reflective member 1 can be obtained.

In the example of FIG. 5, there are nine regions where first regions 31 and second regions 32 intersect. In the example of FIG. 5, the slits 20B are provided in all the nine regions where the first regions 31 and the second regions 32 intersect; however, the present disclosure is not limited thereto, and no slit 20B may be provided in any of the regions where the first regions 31 and the second regions 32 intersect. For example, among the regions where the first regions 31 and the second regions 32 intersect, regions where slits 20B are provided and regions where slits 20B are not provided may be alternately disposed in the first direction X and/or in the second direction Y.

In the example illustrated in FIG. 5, the third slit 23 and the fourth slit 24 are connected to each other. However, the present disclosure is not limited thereto, and the third slit 23 and the fourth slit 24 may be separated from each other. Third slits 23 and fourth slits 24 that are connected, and third slits 23 and fourth slits 24 that are separated may be provided in one reflective member.

Reflective Member 1C

The reflective member 1C is another example of the reflective member. FIG. 6 is a plan view of the exemplary reflective member 1C. The reflective member 1C differs from the reflective member 1 (see FIG. 1 and the like) in that the slits 20 are replaced by slits 20C. In FIG. 6, as an example, openings 10 are arranged in six rows and six columns.

The slit 20C has a curved shape. One slit 20C may have a U-shape in a plan view, and is disposed to face or surround half or more of the outer edge of one circular opening 10. In the example illustrated in FIG. 6, one slit 20C is disposed to face the outer edge of every other opening 10 in the first direction X and the second direction Y. The opening of the U-shape of each of the slits 20C may be directed in a discretionary direction. For example, as illustrated in FIG. 6, when it is assumed that both ends of the arc of each of the slits 20 are connected by a virtual straight line so as to close the opening, the virtual straight line can be arranged so as to be parallel to a first virtual straight line L1 or a second virtual straight line L2.

In the reflective member 1C, at least two slits 20C are provided in at least one first region 31, and the at least two slits 20C intersect or meet a first virtual straight line L1 at prescribed positions in the first region 31. The first virtual straight line L1 is parallel to the first direction X. Further, in the reflective member 1C, at least two slits 20C are provided in at least one second region 32, and the at least two slits 20C intersect or meet a second virtual straight line L2 at prescribed positions in the second region 32. The second virtual straight line L2 is parallel to the second direction Y. Accordingly, when a thermal load is applied to the reflective member 1C, the slits 20C are opened, and thus, substantially the same effects as those of the reflective member 1 can be obtained.

Reflective Member 1D

Figure 7:
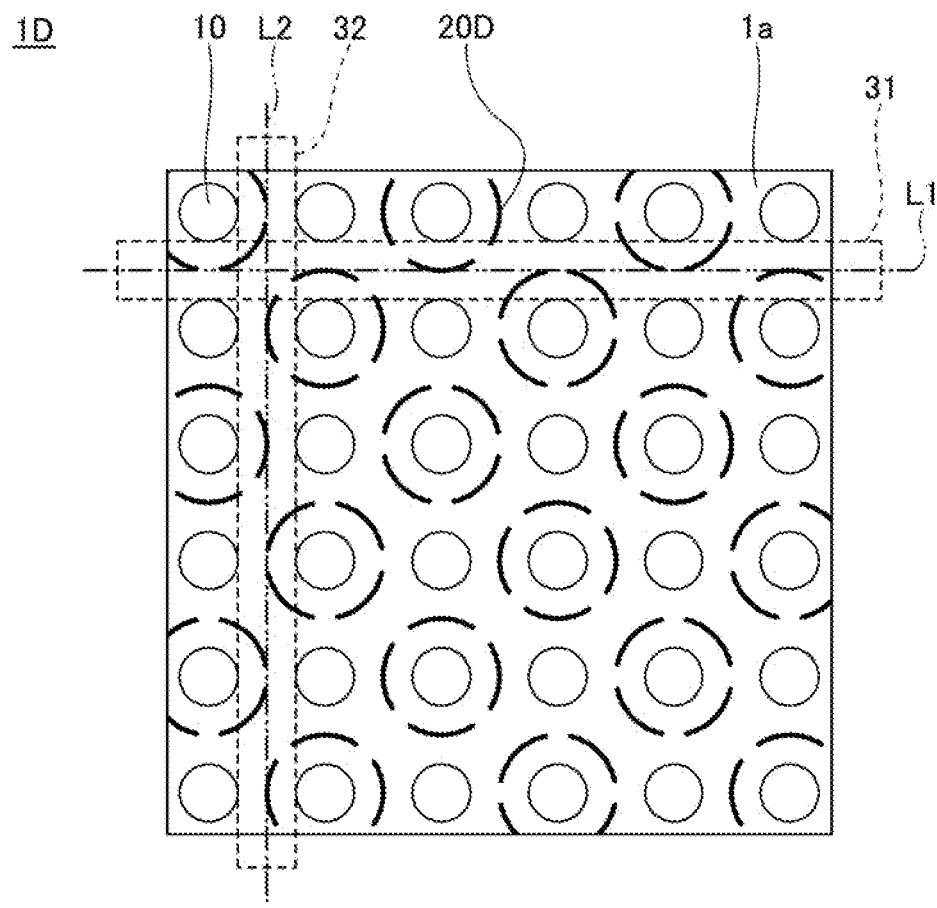
FIG. 7 is a plan view of an exemplary reflective member 1D.

The reflective member 1D is another example of the reflective member. FIG. 7 is a plan view of the exemplary reflective member 1D. The reflective member 1D differs from the reflective member 1 (see FIG. 1 and the like) in that the slits 20 are replaced by slits 20D. In FIG. 7, as an example, openings 10 are arranged in six rows and six columns.

Each slit 20D has a curved shape. For example, a plurality of slits 20D separated from one another are arranged in an arc shape so as to face the outer edge of one opening 10 in a plan view. In the example of FIG. 7, four slits 20D are arranged so as to face the outer edge of every other opening 10 in the first direction X and the second direction Y. Two slits 20D of four slits 20D face each other across one opening 10 in a plan view, the other two slits 20D of the four slits 20D face each other across the one opening 10 in a plan view.

It can be said that the four slits 20D may have a shape obtained by deforming a first slit extending in the second direction, a second slit extending in the first direction, a third slit extending in a direction intersecting the first direction X and the second direction Y, and a fourth slit extending in a direction intersecting the first direction X and the second direction Y and not parallel to the third slit.

In the reflective member 1D, at least two slits 20D are provided in at least one first region 31, and the at least two slits 20D intersect or meet a first virtual straight line L1 at prescribed positions in the first region 31. The first virtual straight line L1 is parallel to the first direction X. Further, in the reflective member 1D, at least two slits 20D are provided in at least one second region 32, and the at least two slits 20D intersect or meet a second virtual straight line L2 at prescribed positions in the second region 32. The second virtual straight line L2 is parallel to the second direction Y. Accordingly, when a thermal load is applied to the reflective member 1D, the slits 20D are opened, and thus, substantially the same effects as those of the reflective member 1 can be obtained.

Reflective Member 1E

The reflective member 1E is another example of the reflective member. FIG. 8 is a plan view of the exemplary reflective member 1E. The reflective member 1E differs from the reflective member 1 (see FIG. 1 and the like) in that the slits 20 are replaced by slits 20E. Further, unlike the example of FIG. 1, in the example of FIG. 8, an X direction (a first direction X) and a Y direction (a second direction Y) that are not orthogonal to each other are defined. In FIG. 8, as an example, a plurality of openings 10 are arranged in nine rows along the first direction X and a plurality of openings 10 are arranged in nine columns along the second direction Y. In the example of FIG. 8, one opening 10 is provide in the first row, three openings 10 are provide in the second row, five openings 10 are provide in the third row, seven openings 10 are provide in the fourth row, eight openings 10 are provide in the fifth row, eight openings 10 are provide in the sixth row, six openings 10 are provide in the seventh row, four openings 10 are provide in the eighth row, and two openings 10 are provide in the ninth row along the first direction X. Further, two openings 10 are provide in the first column, tour openings 10 are provide in the second column, six openings 10 are provide in the third column, eight openings 10 are provide in the fourth column, eight openings 10 are provide in the fifth column, seven openings 10 are provide in the sixth column, five openings 10 are provide in the seventh column, three openings 10 are provide in the eighth column, and one opening 10 is provide in the ninth column along the second direction Y.

The slits 20E includes one or more first slits 21, one or more second slits 22, and one or more third slits 23. The first slits 21, the second slits 22, and the third slit 23 are separated from one another. The first slits 21, the second slits 22, and the third slit 23 may have the same length or may have different lengths.

In the reflective member 1E, at least one first slit 21 or at least one third slit 23 is provided in at least one first region 31, and the at least one first slit 21 or the at least one third slit 23 intersects a first virtual straight line L1 at a prescribed position in the first region 31. The first virtual straight line L1 is parallel to the first direction X. Further, in the reflective member 1E, at least one second slit 22 or at least one third slit 23 is provided in at least one second region 32, and the at least one second slit 22 or the at least one third slit 23 intersects a second virtual straight line L2 at a prescribed position in the second region 32. The second virtual straight line L2 is parallel to the second direction Y. Accordingly, when a thermal load is applied to the reflective member 1E, the first slits 21, the second slits 22, and the third slits 23 are opened, and thus, substantially the same effects as those of the reflective member 1 can be obtained.

As described above, in the reflective member 1E, the first virtual straight line L1 parallel to the first direction X and the second virtual straight line L2 parallel to the second direction Y intersect slits 20E at prescribed positions in the regions (the first region 31 and the second region 32), each of which is located between openings 10 in two adjacent lines. In addition, when a direction intersecting the first direction X and the second direction Y, that is, a direction the same as the X direction of FIG. 1 is referred to as a third direction, a virtual straight line parallel to the third direction can intersect slits 20E at a prescribed position in a region between openings in adjacent rows.

In the reflective member 1E, the manner of definition of the first direction X and the second direction Y is not limited to the example of FIG. 8. For example, the first direction X of FIG. 1 may be defined as the first direction X in the reflective member 1E, and the second direction Y of FIG. 8 may be defined as the second direction Y in the reflective member 1E. In this case, a plurality of openings 10 are arranged in eight lines along the first direction X, and a plurality of openings 10 are arranged in nine lines along the second direction Y. Alternatively, the first direction X of FIG. 1 may be defined as the first direction X in the reflective member 1E, and the first direction X of FIG. 8 may be defined as the second direction Y in the reflective member 1E. In this case, a plurality of openings 10 are arranged in eight lines along the first direction X, and a plurality of openings 10 are arranged in nine lines along the second direction Y.

Reflective Member 1F

Figure 9:
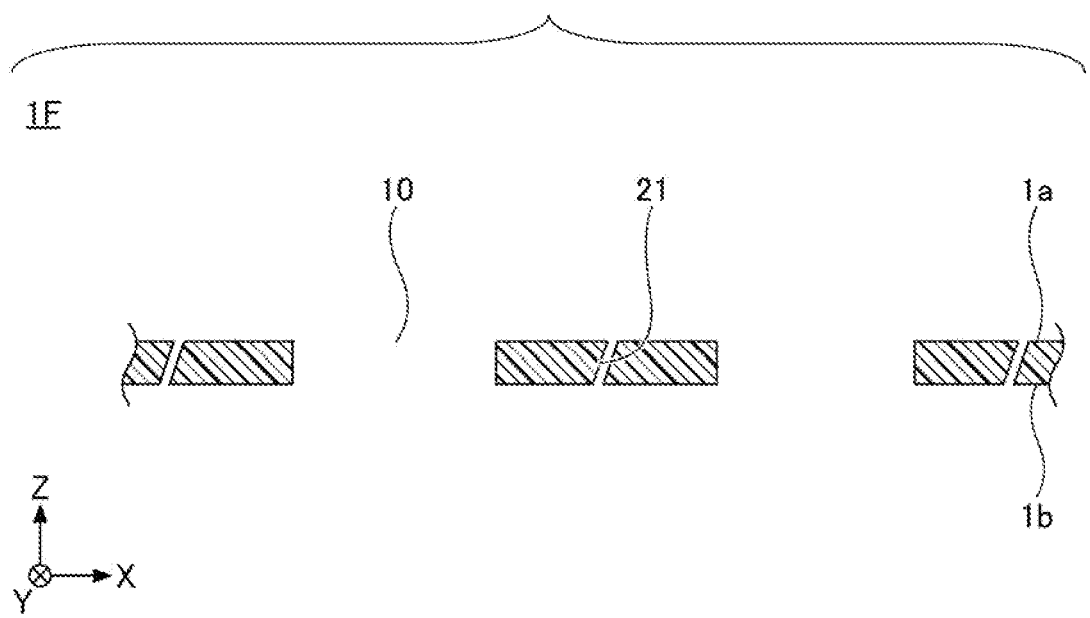
FIG. 9 is a cross-sectional view of an exemplary reflective member 1F.

A reflective member 1F is another example of the reflective member. FIG. 9 is a cross-sectional view of the exemplary reflective member 1F. The reflective member 1F differs from the reflective member 1 (see FIG. 1 and the like) in that first slits 21 are inclined with respect to an upper surface 1a of the reflective member 1F in a cross-sectional view. Similar to the first slits 21 illustrated in FIG. 9, second slits 22 are inclined with respect to the upper surface 1a of the reflective member 1F in a cross-sectional view. The reflective member 1F has the same shape as that illustrated in FIG. 1 in a plan view.

In a case where the reflective member 1F is used in the planar light source, a decrease in light extraction efficiency of the planar light source can be reduced by inclining the first slits 21 and the second slits 22 as illustrated in FIG. 9. For example, if an optical member is disposed above the light sources, portion(s) of light from the light sources may be reflected by the optical member and may return to the reflective member 1F. Inclining the first slits 21 and the second slits 22 can suppress a situation in which light retuning in a direction perpendicular to the upper surface 1a of the reflective member 1F passes through the first slits 21 and the second slits 22 and is absorbed by the substrate.

All of the first slits 21 and the second slits 22 may be inclined with respect to the upper surface 1a of the reflective member 1F in a cross-sectional view. Alternatively, one or more of the first slits 21 and the second slits 22 may be inclined with respect to the upper surface 1a of the reflective member 1F in a cross-sectional view, and the other first slits 21 and second slits 22 may be orthogonal to the upper surface 1a of the reflective member 1F in a cross-sectional view. In the reflective member 1F illustrated in FIG. 9, three slits are inclined in the same direction. However, the present disclosure is not limited thereto, and one or more slits may be inclined in the opposite direction.

Similar to the reflective member 1F, first slits 21 and/or second slits 22 of any reflective member (such as the reflective member 1A) may be inclined with respect to the upper surface of the reflective member.

Planar Light Source 50

Each of the above-described reflective members can be disposed on the substrate to constitute part of the planar light source. In the following, the planar light source will be described by using the reflective member 1 as an example. However, instead of the reflective member 1, any of the above-described reflective members such as the reflective members 1A and 1B may be used. Further, one reflective member may be disposed on the substrate, or a plurality of reflective members may be disposed on the substrate. If a plurality of reflective members are disposed, portions of adjacent reflective members can overlap each other.

Figure 10:
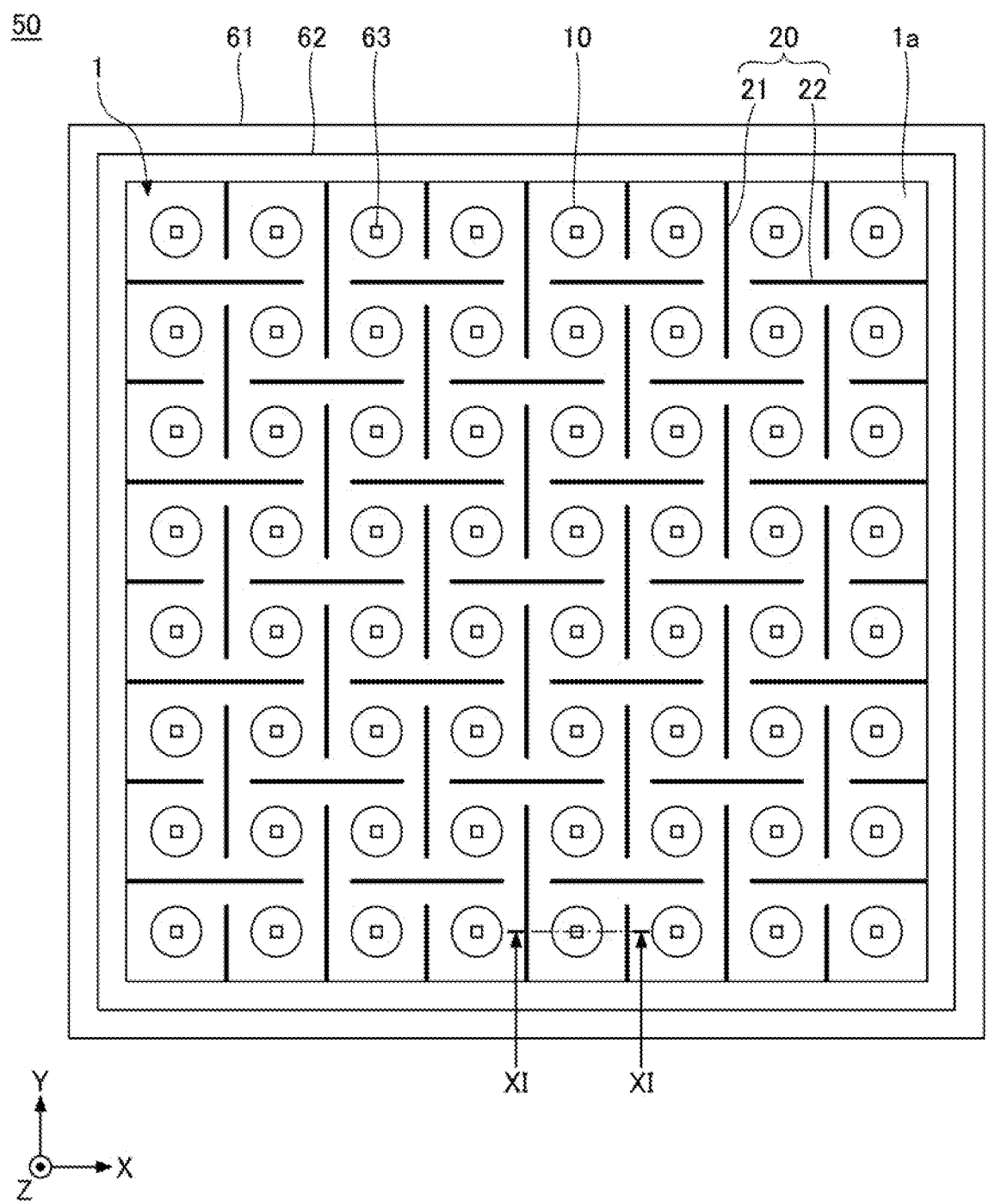
FIG. 10 is a plan view of an exemplary planar light source according to a first embodiment.
Figure 11:
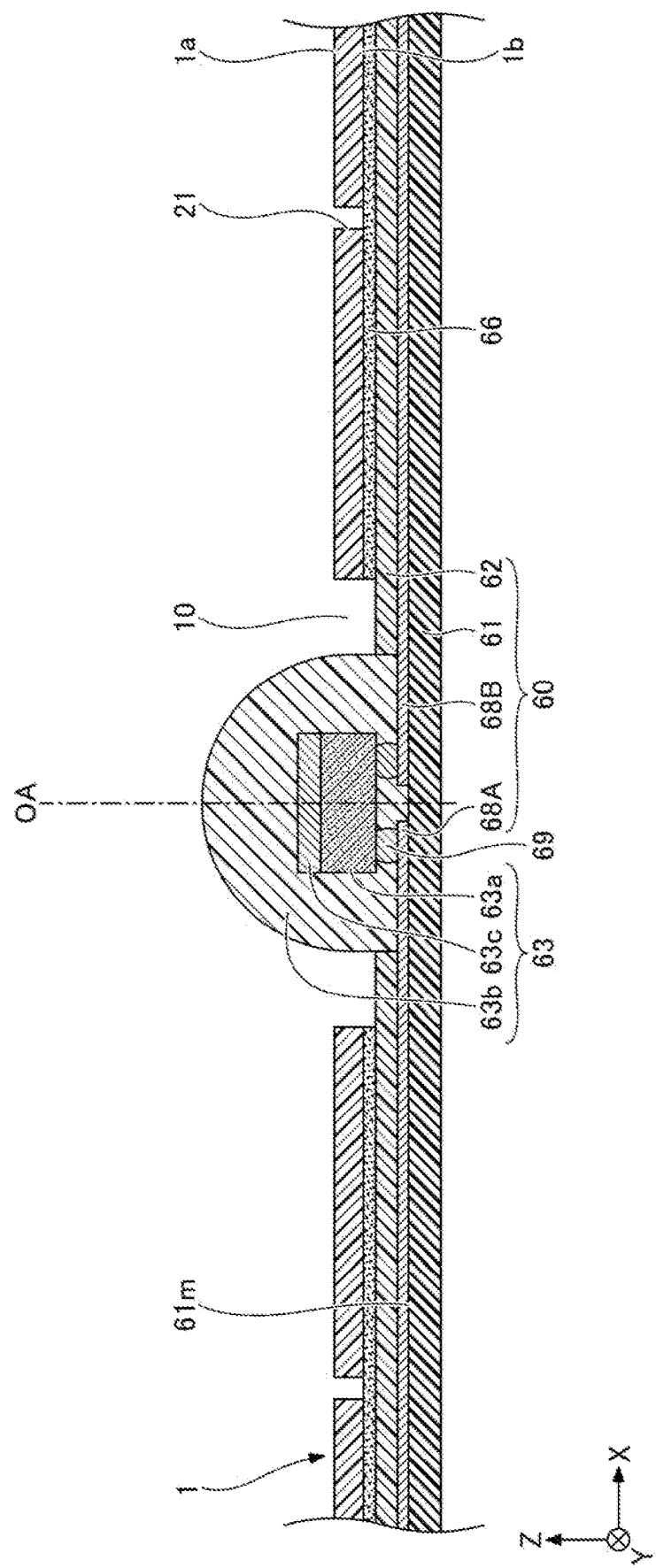
FIG. 11 is a cross-sectional view of the planar light source taken through XI-XI of FIG. 10.

FIG. 10 is a plan view of the exemplary planar light source according to the first embodiment. FIG. 11 is a cross-sectional view of the planar light source taken through XI-XI of FIG. 10. As illustrated in FIG. 10 and FIG. 11, a planar light source 50 is a surface-emitting type light emitting device that includes the reflective member 1, a substrate 60, and a plurality of light sources 63. The reflective member 1 is disposed on the substrate 60. The light sources 63 are disposed on the substrate 60 exposed through the plurality of openings 10 of the reflective member 1. In the following, members included in the planar light source 50 will be described in detail.

(Substrate 60)

The substrate 60 is a member on which the plurality of light sources 63 are placed. In the example of FIG. 11, the substrate 60 includes a base material 61, conductor wiring 68A and 68B, and a cover member 62. The conductor wiring 68A and 68B are members configured to supply power to the light sources 63, and are disposed on an upper surface 61m of the base material 61. In the example of FIG. 11, the cover member 62 covers a portion of regions of the conductor wiring 68A and 68B where no electrical contact is made with light emitting elements.

As the material for the base material 61, a material that can at least isolate the pair of conductor wiring 68A and 68B can be used. Examples of the material include ceramics, resins, and composite materials. Examples of the resins include phenol resins, epoxy resins, polyimide resins, BT resins, polyphthalamide (PPA), and polyethylene terephthalate (PET). Examples of the composite materials include those obtained by mixing any of the above-described resins with inorganic fillers such as glass fibers, $SiO_2$, $TiO_2$, $Al_2O_3$, or the like, glass fiber, and metal substrates obtained by covering a metal material with an insulation layer.

The thickness of the base material 61 can be appropriately selected. The base material 61 can be a flexible substrate manufacturable by roll-to-roll processing, or a rigid substrate.

The material for the conductor wiring 68A and 68B is not particularly limited as long as a conductive material is used. For example, copper can be used.

The cover member 62 has an insulating property. Examples of the material for the cover member 62 include those similar to the materials listed for the base material 61. A material obtained by adding a light-reflective white filler or the like to a discretionary of the above-described resins can be used for the cover member 62. Accordingly, light emitted from the light sources 63 is less likely to be absorbed by the base material 61 can.

In the example illustrated in FIG. 11, the reflective member 1 is fixed to the substrate 60 via an adhesive member 66. The adhesive member 66 may have light reflectivity, may have light transmissivity, and may have light absorbability. In a case where the adhesive member 66 has light reflectivity, even if light from the light sources 63 passes through the first slits 21 and the second slits 22, the adhesive member 66 can reflect the light above the reflective member 1. If the adhesive member is heat-shrinkable, the adhesive member can have slits. The slits of the adhesive member may be located at positions overlapping the slits 20 of the reflective member 1, may be located at positions partially overlapping the slits 20 of the reflective member 1, or may be located at positions apart from the slits 20 of the reflective member 1 so as not to overlap the slits 20 of the reflective member 1. If the slits of the adhesive member 66 are located at positions overlapping the slits 20 of the reflective member 1, the slits of the adhesive member 66 may be opened simultaneously when the slits 20 of the reflective member 1 are opened.

The adhesive member 66 may be, for example, a double-sided tape having an acrylic-resin-based pressure sensitive adhesive on both sides of a PET base material, a hot melt adhesive sheet, or a resin-based adhesive such as a thermo-setting resin or a thermoplastic resin. The adhesive member 66 is preferably highly flame resistant.

By using the adhesive member 66 to fix the reflective member 1 to the substrate 60, contraction of the reflective member 1 can be suppressed even if the reflective member 1 attempts to contract when subjected to heat. This is because the reflective member 1 is fixed to the substrate 60 via the adhesive member 66. Instead of the adhesive member 66, screws, pins, or the like may be used to fix the reflective member 1 to the substrate 60.

(Light Sources 63)

The light sources 63 are disposed on the substrate 60 and disposed in the respective openings 10 of the reflective member 1. The light sources 63 are members configured to emit light. In the example illustrated in FIG. 11, a light emitting element 63a is encapsulated by an encapsulating member 63b in each of the light sources 63. The shape of the encapsulating member 63b is, for example, substantially hemispherical. The material for the encapsulating member 63b is, for example, a silicone resin. The encapsulating member 63b may or may not contain a phosphor and/or a diffuser. The light sources 63 are not limited thereto. The light sources 63 may be a light emitting element that themselves emit light, or may be a light source in which a light emitting element is housed in a recess of a resin molded body and encapsulated by an encapsulating member. Alternatively, the light source 63 may be configured to include a resin containing a light reflecting material that surrounds the lateral surfaces of a light emitting element; and an encapsulating member that covers the upper surface of the light emitting element and the upper surface of the resin containing the light reflecting material. The light source 63 may be configured to include an encapsulating member that covers the upper surface of a light emitting element; and a resin containing a light reflecting material that surrounds the lateral surfaces of the light emitting element and the lateral surfaces of the encapsulating member. This encapsulating member may contain a phosphor. A light-transmissive adhesive member for bonding the light emitting element to the encapsulating member may be disposed between the light emitting element and the encapsulating member. Each of the light sources 63 may use the one light emitting element 63a, or may use a plurality of light emitting elements.

The light sources 63 preferably have wide light distribution in order to reduce luminance nonuniformity. In particular, each of the light sources 63 preferably has batwing light distribution characteristics. With this configuration, the amount of light emitted directly upward from the light source 63 can be reduced, the light distribution of the light sources 63 can be broadened, and the reflective member 1 can be irradiated with the broadened light, thereby reducing luminance nonuniformity.

As used herein, assuming that the optical axis OA is 0 degrees, the "batwing light distribution characteristics" is defined as characteristics having an emission intensity distribution in which the emission intensity is higher than 0 degrees at angles larger in absolute value than 0 degrees in terms of light distribution angles. The optical axis OA is defined as a line passing through the central area of each of the light sources 63 and perpendicularly intersecting the upper surface 61m of the base material 61 as illustrated in FIG. 11.

In particular, examples of the light sources 63 having batwing light distribution characteristics include a light source including the light emitting element 63a provided with a light reflective film 63c on the upper surface of the light emitting element 63a as illustrated in FIG. 11. By providing the light reflective film 63c on the upper surface of the light emitting element 63a, most of light emitted upward from the light emitting element 63a is reflected by the light reflective film 63c, and the amount of light directly above the light emitting element 63a is reduced, so that batwing light distribution characteristics are obtained. In order to obtain a batwing light distribution, lenses may be combined.

The light reflective film 63c may be any of a metal film including at least one of silver, copper, and aluminum, a mixture of a resin and a white filler, and a combination thereof. The light reflective film 63c may be a dielectric multilayer film (DBR film) and may have the incidence angle dependence of the reflectance at the emission wavelength of the light emitting element 63a. Specifically, the reflectance of the light reflective film 63c is preferably lower for oblique incidence than for perpendicular incidence. Accordingly, batwing light distribution characteristics can be obtained.

The size (maximum length) of the light source 63 is, for example, 0.5 mm or more and 5.0 mm or less in a plan view. The thickness of the light source 63 is approximately 0.5 mm or more and 2.0 mm or less. Examples of the light sources 63 include a light source in which the height of the light emitting element 63a directly mounted on the substrate 60 is 100 µm or more and 500 µm or less. The thickness of the light reflective film 63c can be 0.1 µm or more and 3.0 µm or less.

The plurality of light sources 63 are preferably wired on the substrate 60 such that the light sources 63 can be driven independently from one another and can each be subjected to light control (such as local dimming or high dynamic range).

(Light Emitting Element 63a)

The light emitting element 63a has a semiconductor structure. The semiconductor structure includes an n-side semiconductor layer, a p-side semiconductor layer, and an active layer interposed between the n-side semiconductor layer and the p-side semiconductor layer. The active layer may be a single quantum well (SQW) structure or a multiple quantum well (MQW) structure including a plurality of well layers. The semiconductor structure includes a plurality of semiconductor layers formed of nitride semiconductors. The nitride semiconductors include semiconductors of all compositions obtained by varying the composition ratio x and y within their ranges in the chemical formula $In_xAl_yGa_{1-x-y}N$ ($0 \leq x$, $0 \leq y$, $x+y \leq 1$). The peak wavelength of light from the active layer can be appropriately selected in accordance with the purpose. The active layer is configured to emit, for example, visible light or ultraviolet light.

The semiconductor structure may include a plurality of light emitting parts each including an n-side semiconductor layer, an active layer, and a p-side semiconductor layer. If the semiconductor structure includes a plurality of light emitting parts, well layers in the light emitting parts may emit light having different peak emission wavelengths or the same peak emission wavelength. The same peak emission wavelength may include a variation of about several nanometers. A combination of peak emission wavelengths of light from the plurality of light emitting parts can be appropriately selected. For example, if the semiconductor structure includes two light emitting parts, combinations of light emitted from the light emitting parts include blue light and blue light, green light and green light, red light and red light, ultraviolet light and ultraviolet light, blue light and green light, blue light and red light, green light and red light, and the like. For example, if the semiconductor structure includes three light emitting parts, combinations of light emitted from the light emitting parts include blue light, green light, and red light. Each of the light emitting parts may include one or more well layers emitting light having different peak emission wavelengths from those of other well layers.

A bonding member 69 is a member configured to bond the light emitting element 63a to the conductor wiring of the substrate 60. In the case of flip-chip mounting as illustrated in FIG. 11, an electroconductive member is used. Specific examples include Au-containing alloys, Ag-containing alloys, Pd-containing alloys, In-containing alloys, Pb—Pd-containing alloys, Au—Ga-containing alloys, Au—Sn-containing alloys, Sn-containing alloys, Sn—Cu-containing alloys, Sn—Cu—Ag-containing alloys, Au—Ge-containing alloys, Au—Si-containing alloys, Al-containing alloys, Cu—In-containing alloys, and mixtures of metals and fluxes.

(Reflective Member 1)

Figure 12:
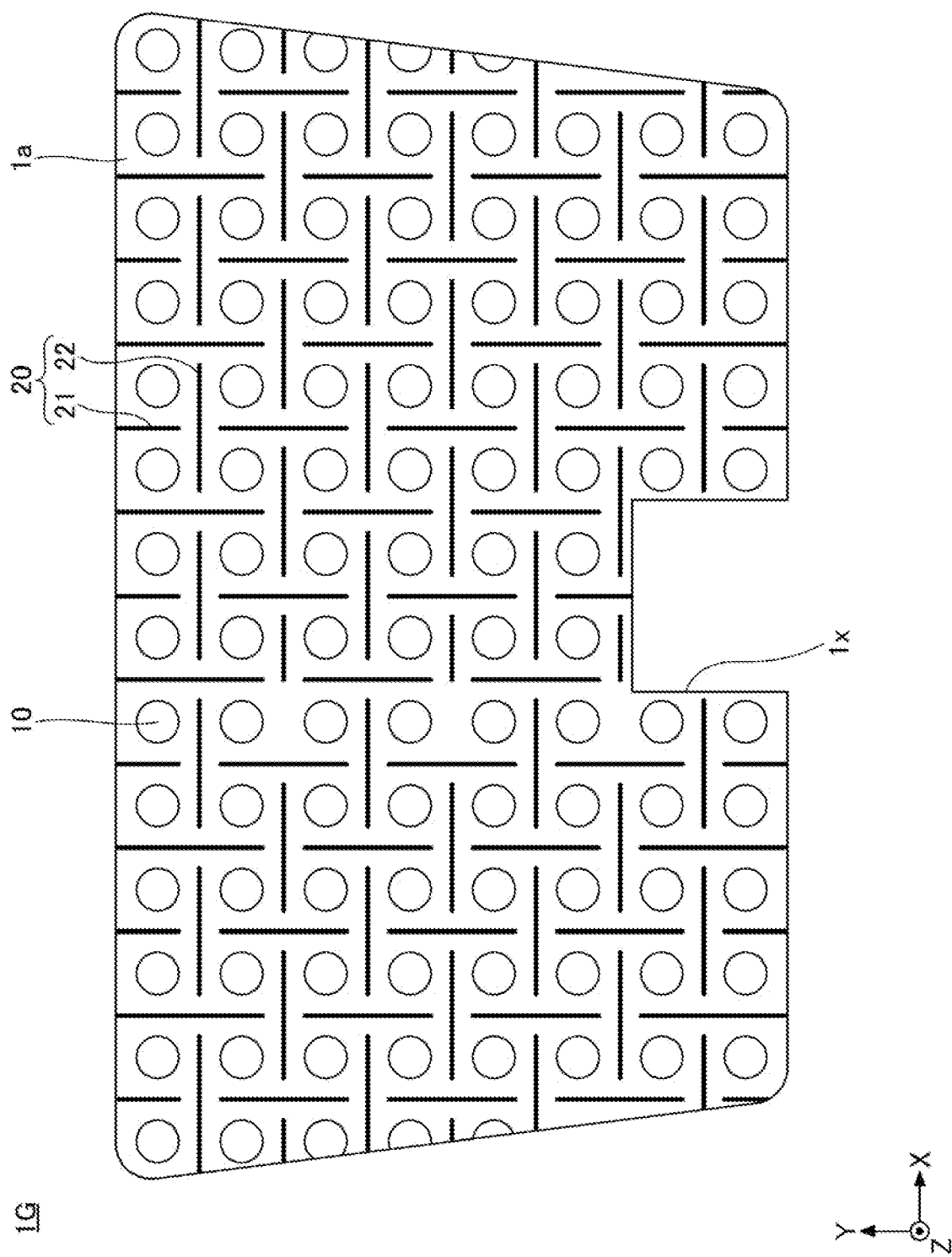
FIG. 12 is a plan view of an exemplary reflective member having an irregular shape.

The reflective member 1 is disposed on the substrate 60. In the example of FIG. 10, the reflective member 1 has a rectangular shape in a plan view. The reflective member 1 may have a polygonal shape, a circular shape, an elliptical shape, or the like in a plan view. The reflective member 1 may have an irregular shape. Examples of the irregular shape includes a shape combining two or more shapes including a polygonal shape such as a triangular shape or a quadrangular shape, a circular shape, and an elliptical shape, and a shape partially having a recess. FIG. 12 is a plan view of a reflective member having an irregular shape. A reflective member 1G illustrated in FIG. 12 has a substantially inverted trapezoidal shape whose width in the X direction decreases from the +Y side toward the −Y side. A recess 1x having a rectangular shape is provided approximately in the central area in the X direction and on the −Y side of the reflective member 1G. The upper surface of the reflective member 1 may be a flat surface or a rough surface.

In the reflective member 1, the shape and the size of an opening 10 can be set such that a light source 63 is entirely exposed. The opening 10 may have the same size as or may be larger than the light source to be used. In the example illustrated in FIG. 10, the opening 10 has a circular shape in a plan view. However, the present disclosure is not limited thereto, and the opening 10 can have an elliptical shape, a polygonal shape such as a triangle shape or a rectangle shape, or a shape similar to any of these shapes in a plan view. The shape of the opening 10 may be the same as or different from the shape of the light source in a plan view.

The size (maximum length) of the opening 10 is, for example, one to two times as large as one side of the light source 63 in a plan view. For example, if the size (maximum length) of the light source 63 is 0.5 mm or more and 5 mm or less in a plan view, the size of the opening 10 can be set to be 0.5 mm or more and 10 mm or less. The lateral surfaces of the reflective member defining the opening 10 are preferably located in the vicinity of the light source 63. That is, a gap between the opening 10 and the light source 63 is preferably small. Accordingly, a large amount of light from the light source 63 can be reflected by the reflective member 1, and the light extraction efficiency can be increased. In the reflective member 1, openings 10 may be formed before slits 20 are formed, after slits 20 are formed, or simultaneously when slits 20 are formed.

The reflective member 1 may be formed by using a resin containing a reflective material formed of at least one of titanium oxide, and aluminum oxide, silicon oxide, or may be formed by using a resin containing no reflective material and disposing a reflective material on the surface. Alternatively, a resin containing a plurality of micro air bubbles may be used. In this case, the interfaces between the air bubbles and the resin reflect light. Examples of the resin used for the reflective member 1 include thermoplastic resins, such as acrylic resins, polycarbonate resins, cyclic polyolefin resins, polyethylene terephthalate (PET), polyethylene naphthalate, and polyester, and thermosetting resins such as epoxy resins and silicone resins. The reflective member 1 is preferably set such that the reflectance of light emitted from light sources 63 is 70% or more.

The optical member can be disposed above the planar light source 50. The optical member is, for example, a diffusion plate. Accordingly, the uniformity of light passing through the optical member from the planar light source 50 can be improved. The optical member may further include, above the diffusion plate, at least one selected from the group consisting of a wavelength conversion sheet, a first prism sheet, a second prism sheet, and a DBEF (reflective polarizing sheet). Accordingly, the uniformity of light can be further improved. For example, the wavelength conversion sheet absorbs a portion of blue light emitted from the light sources 63, and emits yellow light, green light, and/or red light.

White light is obtained by mixing blue light that has passed through the wavelength conversion member with yellow light, green light, and/or red light emitted from the wavelength conversion member. The wavelength conversion sheet is positioned apart from the light emitting element 63a of each of the light sources 63. Therefore, the wavelength conversion sheet can contain a phosphor having poor resistance to heat or light intensity, which is difficult to use in the vicinity of the light emitting element 63a. Accordingly, the performance of the planar light source 50 as a backlight can be improved.

Examples of the phosphor included in the wavelength conversion sheet include yttrium aluminum garnet based phosphors (for example, $(Y,Gd)_3(Al,Ga)_5O_{12}:Ce$), lutetium aluminum garnet based phosphors (for example, $Lu_3(Al,Ga)_5O_{12}:Ce$), terbium aluminum garnet based phosphors (for example, $Tb_3(Al,Ga)_5O_{12}:Ce$), CCA based phosphors (for example, $Ca_{10}(PO_4)_6Cl_2:Eu$), SAE based phosphors (for example, $Sr_4Al_{14}O_{25}:Eu$), chlorosilicate based phosphors (for example, $Ca_8MgSi_4O_{16}Cl_2:Eu$), silicate based phosphors (for example, $(Ba,Sr,Ca,Mg)_2SiO_4:Eu$), oxynitride based phosphors such as β-SiAlON based phosphors (for example, $(Si,Al)_3(O,N)_4:Eu$) and α-SiAlON based phosphors (for example, $Ca(Si,Al)_{12}(O,N)_{16}:Eu$), nitride based phosphors such as LSN based phosphors (for example, $(La,Y)_3Si_6N_{11}:Ce$), BSESN based phosphors (for example, $(Ba,Sr)_2Si_5N_8:Eu$), SLA based phosphors (for example, $SrLiAl_3N_4:Eu$), CASN based phosphors (for example, $CaAlSiN_3:Eu$), and SCASN based phosphors (for example, $(Sr,Ca)AlSiN_3:Eu$), fluoride based phosphors such as KSF based phosphors (for example, $K_2SiF_6:Mn$), KSAF based phosphors (for example, $K_2(Si_{1-x}Al_x)F_{6-x}:Mn$, where x satisfies 0<x<1), and MGF based phosphors (for example, $3.5MgO \cdot 0.5MgF_2 \cdot GeO_2:Mn$), quantum dots having a Perovskite structure (for example, $(Cs,FA,MA)(Pb,Sn)(F,Cl,Br,I)_3$, where FA and MA represent formamidinium and methylammonium, respectively), II-VI quantum dots (for example, CdSe), III-V quantum dots (for example, InP), and quantum dots having a chalcopyrite structure (for example, $(Ag,Cu)(In,Ga)(S,Se)_2$).

If the encapsulating member 63b contains a phosphor, any of the materials described above can be used for the phosphor. For example, if the light emitting element 63a emits blue light, white light can be extracted from the light sources.

The planar light source 50 may have a shape parallel to the X-Y plane, or may have a shape curved towards the +Z side or the −Z side with respect to the X-Y plane. For example, the planar light source 50 may have a curved shape in which the central area of the planar light source 50 is recessed towards the −Z side in the X direction.

Second Embodiment

In a second embodiment, an example of a liquid crystal display device that uses the planar light source 50 as a backlight light source will be described.

Figure 13:
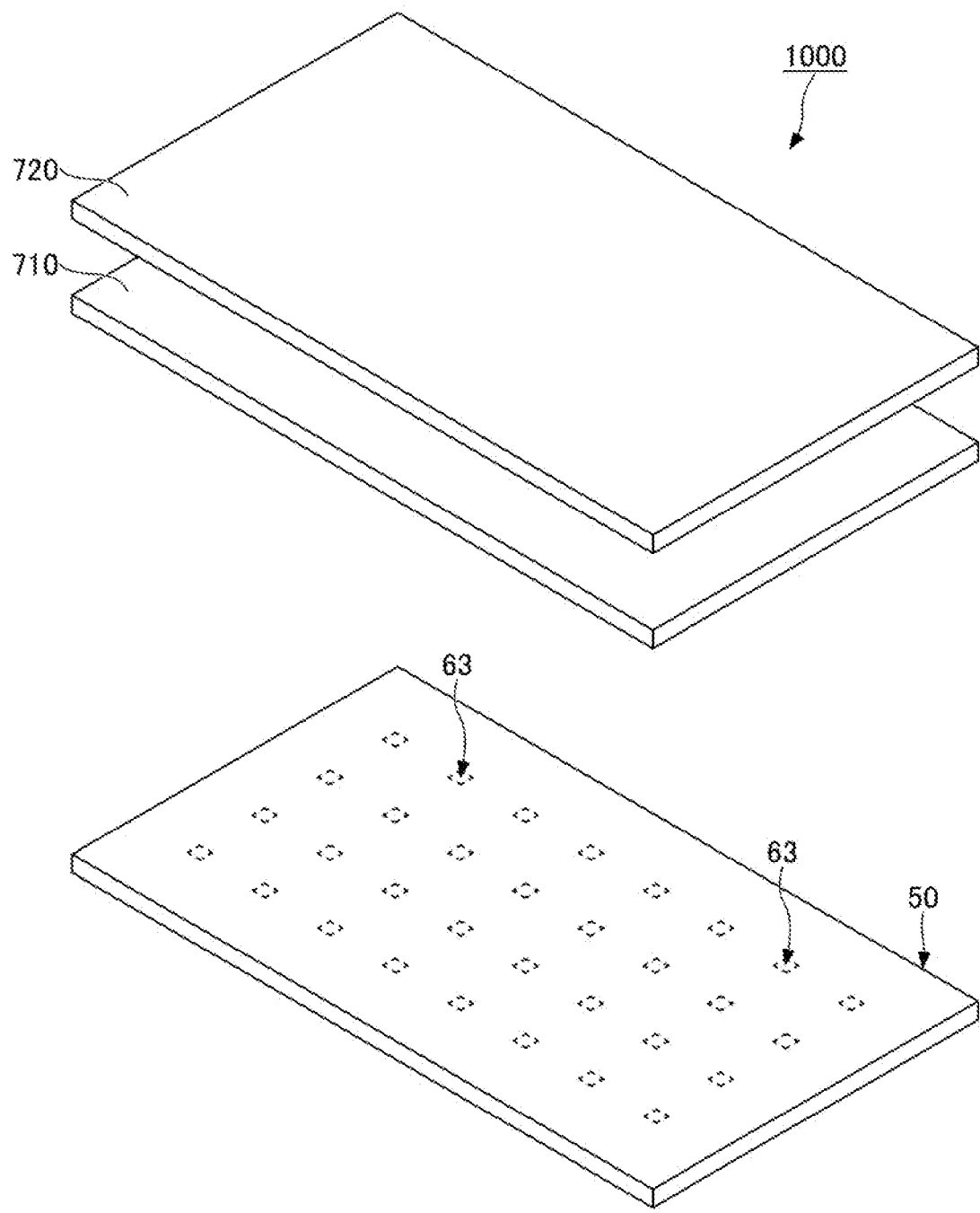
FIG. 13 is a configuration diagram illustrating an exemplary liquid crystal display device according to a second embodiment.

FIG. 13 is a configuration diagram illustrating a liquid crystal display device according to the second embodiment. As illustrated in FIG. 13, a liquid crystal display device 1000 includes, from the top, a liquid crystal panel 720, an optical member 710, and the planar light source 50. As the optical member 710, an optical member that includes a diffusion plate, a phosphor sheet, a first prism sheet, a second prism sheet, and a DBEF (reflective polarizing sheet), which are stacked above the light sources 63 of the planar light source 50 in this order from the planar light source 50 side, may be used.

The liquid crystal display device 1000 is what is known as a direct lit liquid crystal display device in which the planar light source 50 is disposed below the liquid crystal panel 720. In the liquid crystal display device 1000, the liquid crystal panel 720 is irradiated with light emitted from the planar light source 50.

From the viewpoint of reducing the thickness of the planar light source, the thickness of the planar light source can be 15 mm or less. Accordingly, the thickness of the planar light source can be reduced, thereby reducing the thickness of the liquid crystal display device 1000.

As a backlight of the liquid crystal display device 1000, the planar light source 50 can be used for a television, a tablet, a smartphone, a smartwatch, a head-up display, digital signage, or a bulletin board. The planar light source 50 can be used as a light source for lighting, as well as for an emergency light, linear lighting, various lightings, an in-vehicle instrument panel, or the like.

According to an embodiment of the present disclosure, thermal contraction of a reflective member in a planar light source including the reflective member can be reduced. Further, the reflective member used in the planar light source can be provided, and a liquid crystal display device using the planar light source can be provided.

Although embodiments and the like have been described in detail above, the above-described embodiments and the like are non-limiting examples, and various modifications and substitutions can be made to the above-described embodiments and the like without departing from the scope recited the claims.

What is claimed is:

1. A planar light source comprising:
   a substrate;
   a reflective member disposed on the substrate and defining
      at least one slit, and
      a plurality of openings arranged in m rows along a first direction and in n columns along a second direction that intersects the first direction; and
   one or more light sources disposed on the substrate and disposed in one or more of the openings of the reflective member in a plan view, wherein
   the at least one slit of the reflective member includes at least one first slit arranged in a first region and intersecting a first virtual straight line at a prescribed position in the first region,
   the first virtual straight line is parallel to the first direction,
   the first region is located between one or more of the openings in a kth row (k is an integer equal to or greater than 1 and less than or equal to m−1) and one or more of the openings in a (k+1)th row, and the first region extends in the first direction, and
   the at least one slit penetrates from an upper surface of the reflective member to a lower surface of the reflective member.

2. The planar light source according to claim 1, wherein
   the at least one slit further includes at least one second slit arranged in the first region, and
   the at least one first slit extends in the second direction, and
   the at least one second slit extends in the first direction and is spaced apart from the at least one first slit.

3. The planar light source according to claim 2, wherein
   the at least one first slit includes a plurality of first slits and the at least one second slit includes a plurality of second slits, and
   the plurality of first slits and the plurality of second slits are alternately disposed in the first direction in the first region.

4. The planar light source according to claim 3, wherein
   at least one of the plurality of second slits reaches an outer edge of the reflective member in the first region in the plan view.

5. The planar light source according to claim 1, wherein
   the at least one slit further includes at least one second slit, and
   the at least one first slit extends in the second direction, and the at least one second slit extends in the first direction and is connected to the at least one first slit.

6. The planar light source according to claim 1, wherein
   the at least one slit includes at least one second slit arranged in a second region and intersecting a second virtual straight line at a prescribed position in the second region,
   the second virtual straight line is parallel to the second direction, and
   the second region is located between one or more third openings in a jth column (j is an integer equal to or greater than and less than or equal to n−1) and one or more fourth openings in a (j+1)th column, and the second region extends in the second direction.

7. The planar light source according to claim 6, wherein
   the at least one first slit extends in the second direction, the at least one second slit extends in the first direction, and
   the at least one second slit is spaced apart from the at least one first slit.

8. The planar light source according to claim 7, wherein
   the at least one first slit includes a plurality of first slits and the at least one second slit includes a plurality of second slits, and
   the plurality of first slits and the plurality of second slits are alternately arranged in the second direction in the second region.

9. The planar light source according to claim 8, wherein
   at least one of the plurality of first slits reaches an outer edge of the reflective member in the second region.

10. The planar light source according to claim 1, wherein
    the at least one first slit includes at least one third slit and at least one fourth slit, and
    the at least one third slit extends in a third direction intersecting both the first direction and the second direction, and
    the at least one fourth slit intersects the third slit and extends in a fourth direction intersecting both the first direction and the second direction.

11. The planar light source according to claim 10, wherein
    the at least one third slit includes a plurality of third slits and the at least one fourth slit includes a plurality of fourth slits,
    the plurality of third slits and the plurality of fourth slits are arranged in the first region,
    at least one of the plurality of third slits reaches one of outer edges of the reflective member in the plan view, and
    at least one of the plurality of fourth slits reaches the one of the outer edges of the reflective member in the plan view.

12. The planar light source according to claim 1, wherein
the at least one slit further includes a second slit and a third slit, and
the third slit extends in a third direction intersecting both the first direction and the second direction, and
the second slit is spaced apart from the third slit and extends in the first direction.

13. The planar light source according to claim 1, wherein
the at least one slit is inclined with respect to an upper surface of the reflective member in a cross-sectional view.

14. The planar light source according to claim 1, wherein
the at least one slit has a curved shape in the plan view.

15. The planar light source according to claim 1, wherein
the reflective member is bonded to the substrate by an adhesive member.

16. The planar light source according to claim 15, wherein
the adhesive member has light reflectivity.

17. A liquid crystal display device comprising
a backlight light source including the planar light source according to claim 1.

18. A reflective member comprising:
a sheet-shaped body defining
a plurality of openings arranged in m rows along a first direction and in n columns along a second direction that intersects the first direction, and
at least one slit arranged in a first region and intersects a first virtual straight line at a prescribed position in the first region, wherein
the first virtual straight line is parallel to the first direction,
the first region is located between one or more of the openings in a kth row (k is an integer equal to or greater than 1 and less than or equal to m−1) and one or more of the openings in a (k+1)th row, and the first region extends in the first direction, and
the at least one slit penetrates from an upper surface of the reflective member to a lower surface of the reflective member.

* * * * *